United States Patent
Takeuchi et al.

(10) Patent No.: US 7,327,745 B2
(45) Date of Patent: Feb. 5, 2008

(54) PACKET TRANSMISSION SYSTEM AND A TERMINAL APPARATUS

(75) Inventors: Osamu Takeuchi, Kawasaki (JP); Yuuji Kamura, Kawasaki (JP); Hideaki Arao, Kawasaki (JP); Hirotaka Morita, Kawasaki (JP); Hiroyuki Ohgaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 11/037,651

(22) Filed: Jan. 18, 2005

(65) Prior Publication Data

US 2005/0152349 A1 Jul. 14, 2005

Related U.S. Application Data

(63) Continuation of application No. PCT/JP02/12527, filed on Nov. 29, 2002.

(51) Int. Cl.
*H04L 12/28* (2006.01)

(52) U.S. Cl. ............... 370/401; 370/907; 370/231; 398/181

(58) Field of Classification Search ............... None
See application file for complete search history.

(56) References Cited

U.S. PATENT DOCUMENTS

| | | | |
|---|---|---|---|
| 5,712,847 A | 1/1998 | Hata | |
| 6,256,291 B1 | 7/2001 | Araki | |
| 6,909,853 B1 | 6/2005 | Yamashita | |
| 2002/0024697 A1 | 2/2002 | Maeno | |
| 2002/0027703 A1* | 3/2002 | Kinoshita et al. | 359/337.1 |
| 2002/0063934 A1 | 5/2002 | Sakauchi | |
| 2004/0208532 A1* | 10/2004 | Myoung et al. | 398/33 |
| 2005/0135807 A1* | 6/2005 | Fujita et al. | 398/45 |

FOREIGN PATENT DOCUMENTS

| | | |
|---|---|---|
| EP | 0 935 357 | 8/1999 |
| EP | 0 936 759 | 8/1999 |
| JP | 4-014935 | 1/1992 |
| JP | 5-292083 | 11/1993 |
| JP | 5-327635 | 12/1993 |
| JP | 7-038541 | 2/1995 |
| JP | 8-288981 | 11/1996 |
| JP | 9-135229 | 5/1997 |
| JP | 11-112388 | 4/1999 |
| JP | 11-225128 | 8/1999 |
| JP | 11-298408 | 10/1999 |

(Continued)

OTHER PUBLICATIONS

International Search Report dated Mar. 4, 2003.

(Continued)

*Primary Examiner*—Duc Ho
(74) *Attorney, Agent, or Firm*—Katten Muchin Rosenman LLP

(57) ABSTRACT

A packet transmission system is disclosed. The system serves between terminal apparatuses that include a supervisory control circuit configured to transmit a supervisory signal in a direction opposite to the transmission direction of a main signal on each of and both of an upstream circuit and a downstream circuit. The packet transmission system transmits overhead information of a packet frame of the main signal of the upstream circuit and the downstream circuit using the supervisory control circuit of the downstream circuit and the upstream circuit, respectively.

13 Claims, 15 Drawing Sheets

FOREIGN PATENT DOCUMENTS

| | | |
|---|---|---|
| JP | 2000-031969 | 1/2000 |
| JP | 2000-049731 | 2/2000 |
| JP | 2000-183853 | 6/2000 |
| JP | 2000-324057 | 11/2000 |
| JP | 2002-164846 | 6/2002 |
| JP | 2002-164926 | 6/2002 |

OTHER PUBLICATIONS

Notice of Reasons for Refusal issued on May 19, 2006, with translation.

* cited by examiner

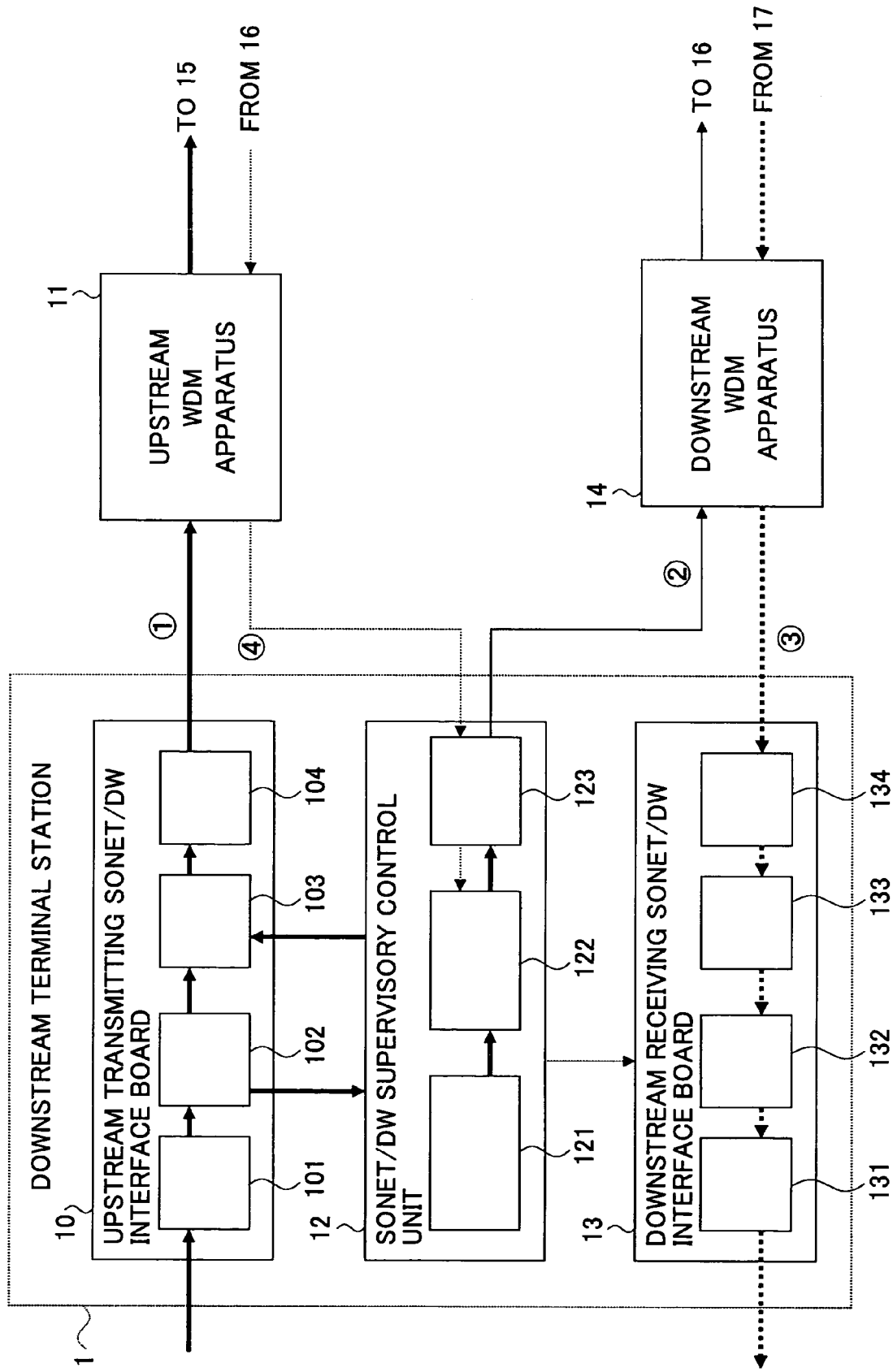

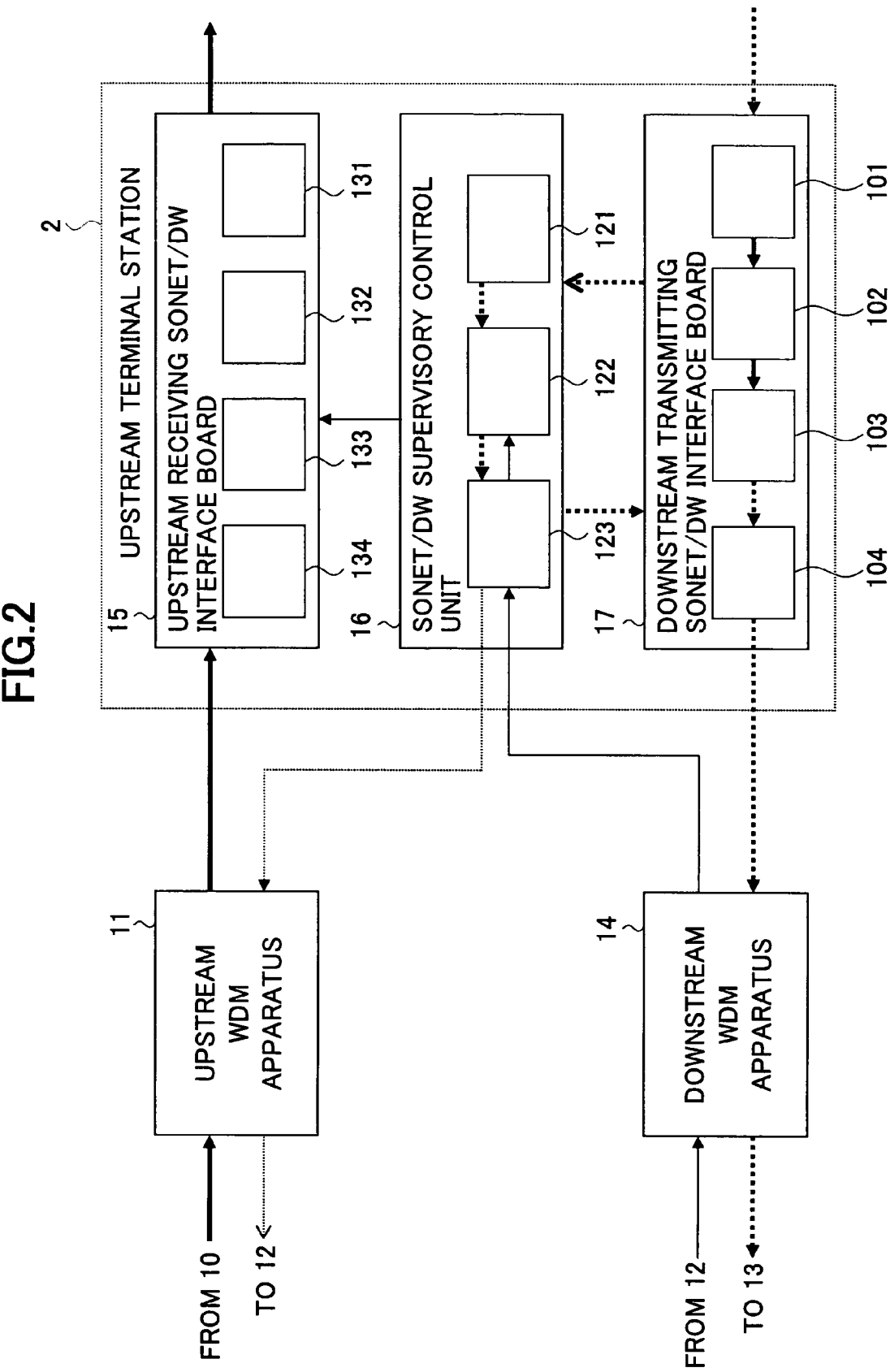

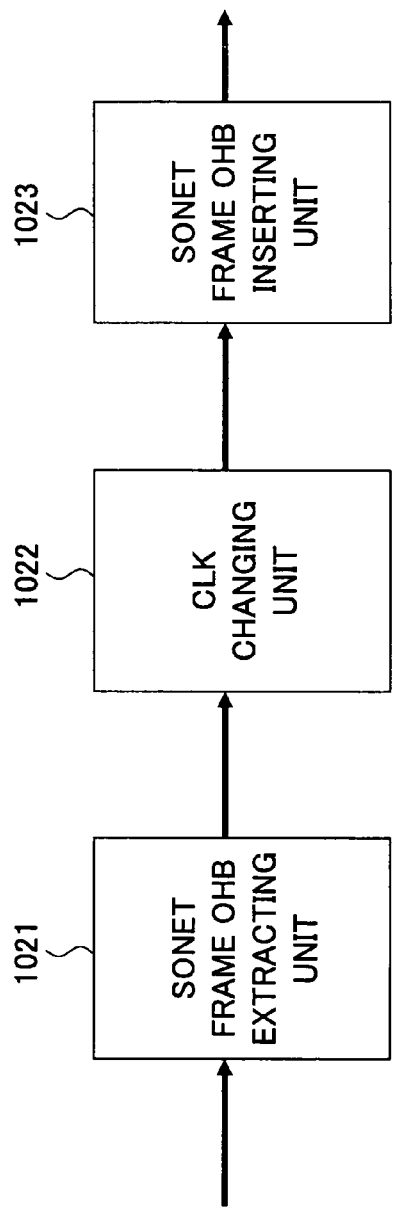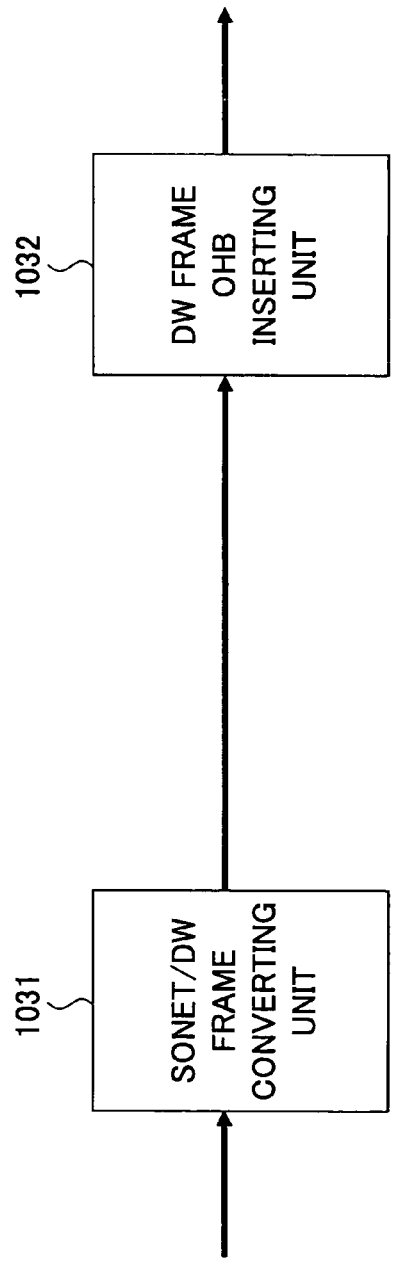

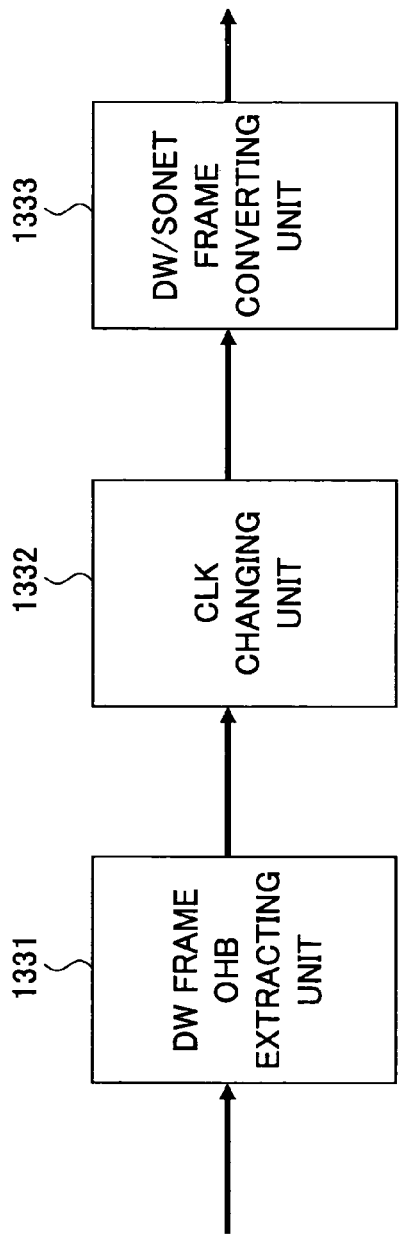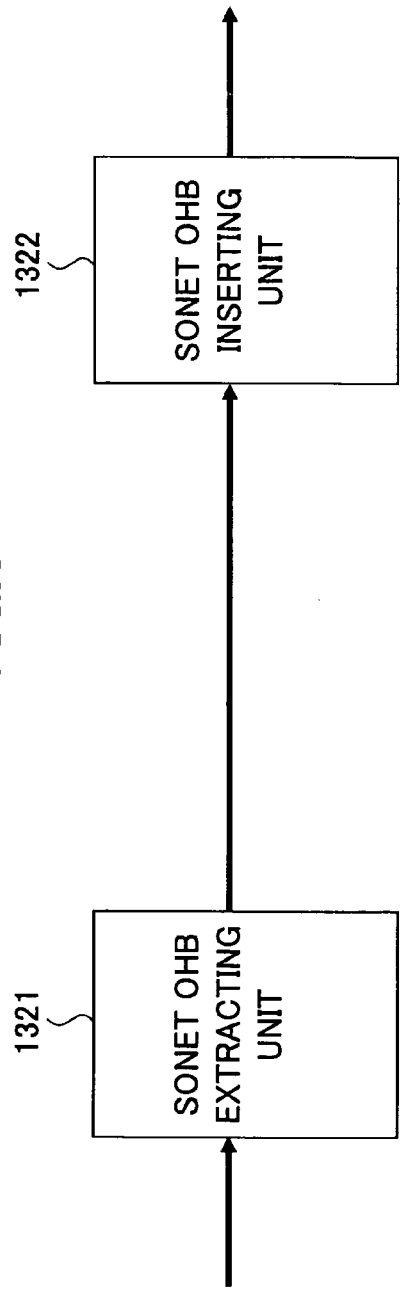

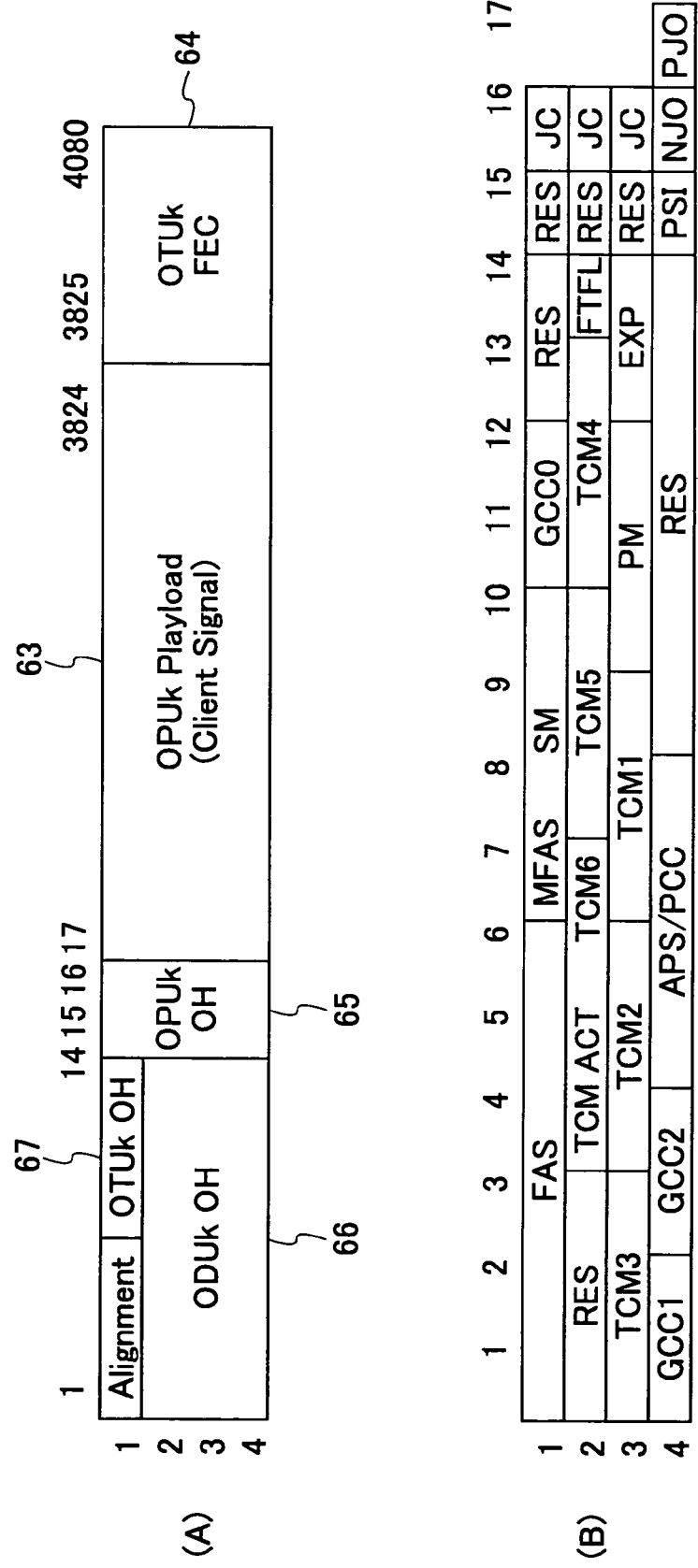

FIG.14

| Abbreviations | |
|---|---|
| APS/PCC | Automatic protection switching/ protection communication channel |
| EXP | Experimental |
| FAS | Frame alignment signal |
| FTFL | Fault type and fault location |
| GCCO-3 | General communication channel |
| JC | Justification control |
| MFAS | Multi frame alignment signal |
| NJO | Negative justification opportunity |
| PM | Path monitoring |
| PSI | Payload structure identifier |
| RES | Reserved |
| SM | Section monitoring |
| TCM ACT | Tandem connection monitoring activation |
| TCM1-6 | Tandem connection monitoring |

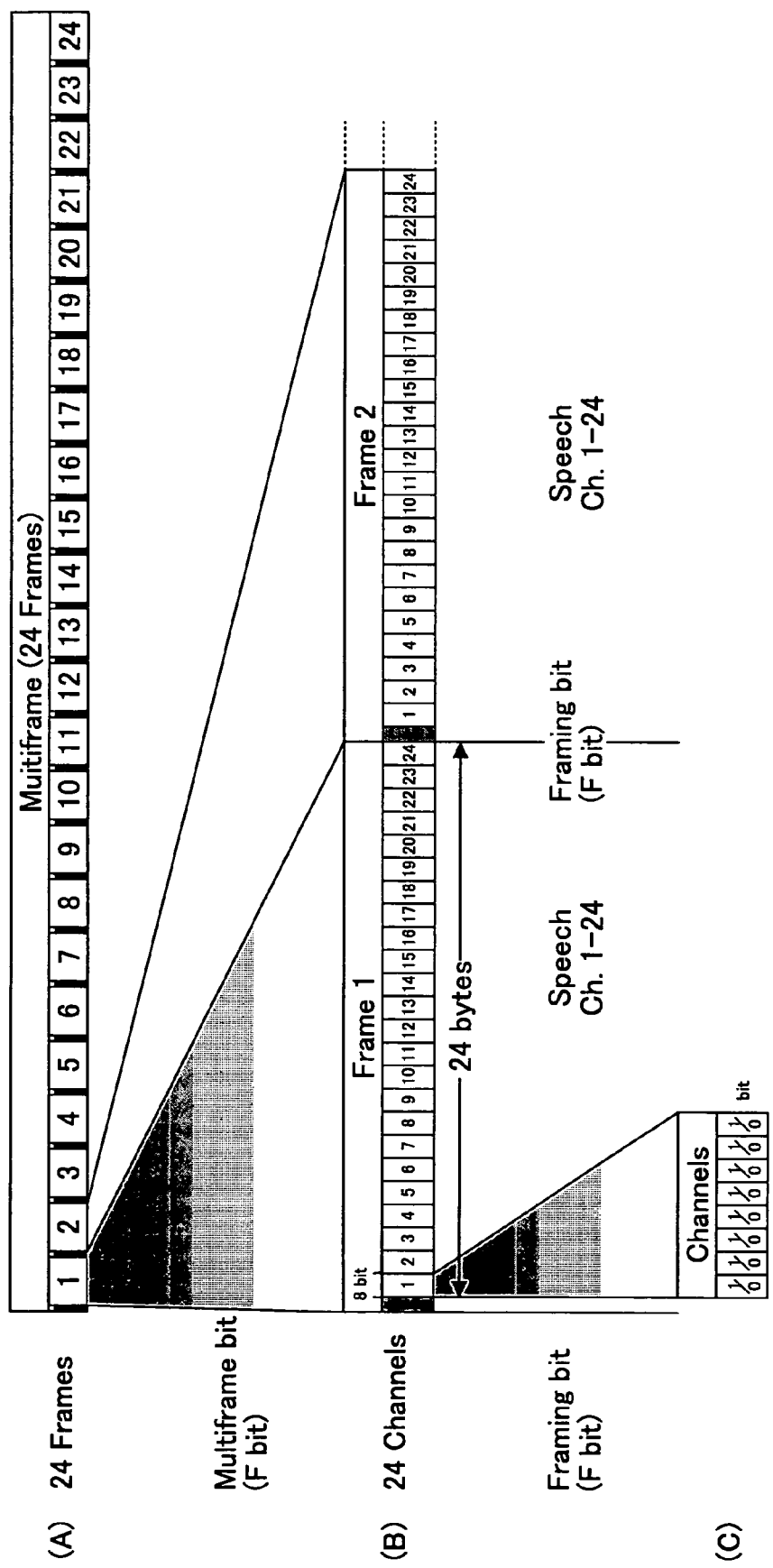

FIG.16

(A) 24 bytes in Sub-Frame (125us)

| items | byte | description |
|---|---|---|
| TRACE | 1 | OSC Trace byte |
| OW1 | 1 | Orderwire |
| OW CUT | 1 | Orderwire cut |
| USER | 1 | User Channel |
| DCC | 3 | DCC |
| Reserve | 1 | Reserved byte |
| WCx AIS | 1 | WCx AIS and AMP control |
| SD1 | 1 | Shutdown Indication and maintenance |
| OW2 | 1 | Extra OW |
| TC | 1 | Time control byte (for NTT) |
| WCF1~4 | 4 | Wavelength Failure Byte |
| RIR1/2 | 2 | Reserved Interrupt Register |
| R1~4 | 4 | Reserve bytes |
| MB | 1 | Multi-frame byte (WCR/WCS and reserved) |
| BIP-8 | 1 | Parity check |
| Total | 24 | |

(B) 24 Sub-Frames in Multi-Frames (3ms)

| items | byte | description |
|---|---|---|
| WCR | 4 | Wavelength Rate Byte |
| WCS | 4 | Wavelength Status Byte |
| Reserve | 16 | Reserved byte |
| Total | 24 | |

PACKET TRANSMISSION SYSTEM AND A TERMINAL APPARATUS

CROSS-REFERENCE TO RELATED APPLICATION

This application is a U.S. continuation application filed under 35 USC 111(a) claiming benefit under 35 USC 120 and 365(c) of PCT International Application No. PCT/JP02/12527 filed on Nov. 29, 2002, which is hereby incorporated herein by reference.

BACKGROUND OF THE INVENTION

1. Field of the Invention

The present invention generally relates to a packet transmission system and a terminal apparatus, and especially relates to a packet transmission system and a terminal apparatus thereof that include a supervisory control circuit configured to transmit a supervisory control signal in a direction opposite to a main signal transmission direction on each of and both of an upstream circuit and a downstream circuit.

2. Description of the Related Art

In recent years and continuing, in order to reduce system cost in optical wavelength multiplex transmission systems, relay stations directly amplify optical signals using optical amplifiers without using opto-electric converters. Thereby, while the cost of the relay stations is reduced, a long transmission distance becomes available, enabling providing long distance optical wavelength multiplex transmission systems.

When optical ADM (OADM: Optical Add Drop Multiplexing) and optical XC (OXC: Optical Cross Connect) are realized, and a WDM (Wavelength Division Multiplex) network is realized with the relay stations being structured without performing opto-electric conversion, one-way transmission of optical wavelength multiplex signals becomes important.

At present, in order to obtain a reliable one-way transmission of the optical wavelength multiplex signals, supervision and control of the transmission are performed using a supervisory control signal.

As conventional technology, JPA 5-292083 discloses technology of using a wavelength different from a main signal as the supervisory control signal. Frame overhead of SONET (Synchronous Optical Network)/SDH (Synchronous Digital Hierarchy) is mapped to the supervisory control signal, and the mapped supervisory signal is transmitted in the transmission direction of the main signal such that the optical relay stations are supervised. The supervisory control signal has a frame length of 48 bytes, and is transmitted at 384 kbps, i.e., the frame cycle serves as 1 ms. The frame contains a receiving station ID, a transmitting station ID, an alarm information area, an FCS (Frame Check Sequence) area, an optical amplification repeater unit AIS (Alarm Indication Signal) area, an order-wire area, and a DCC (Data Communication Channel) area.

The invention disclosed by JPA 5-292083 uses the advanced management functions of SONET/SDH, and treats an interval between optical repeaters as a section, and an interval between terminal apparatuses as a line. For this reason, overhead functions, such as AIS of SONET/SDH, an order-wire, and DCC, are assigned to the supervisory control signal.

However, the referenced invention does not take redundancy of the supervisory control signal into consideration. Therefore, cost to provide a spare (stand-by) circuit becomes nearly the same as the main circuit.

Further, the conventional technology of the referenced invention does not take into consideration bidirectional transmission of the supervisory control signal. Therefore, in order to realize bidirectional transmission of the supervisory control signal, bidirectional transmission of the main signal is needed, which causes additional apparatus cost.

SUMMARY OF THE INVENTION

Accordingly, a general objective of the present invention is to offer a packet transmission system and a terminal apparatus thereof that solve the problems described above, and a specific objective of the present invention is to offer a transmission system and a terminal apparatus thereof that can reliably and economically transmit the supervisory control signal.

In order to achieve the objective, the present invention provides a packet transmission system for packet transmission between terminal apparatuses, each having a supervisory control circuit configured to transmit the supervisory control signal in a direction opposite to the main signal transmission of each and both of an upstream circuit and a downstream circuit.

The packet transmission system is configured such that overhead information of packet frames of the main signals of the upstream circuit and the downstream circuit are transmitted using the supervisory control circuits of the downstream circuit and the upstream circuit, respectively.

Further, in order to attain the objective, the present invention provides a packet transmission system for packet transmission between the terminal apparatuses, each having a supervisory control circuit configured to transmit the supervisory control signal bidirectionally on each and both of the upstream and the downstream circuits.

The packet transmission system includes a supervisory control apparatus configured to supervise and control the terminal apparatuses and the transmission line in-between.

The supervisory control apparatus is configured such that the overhead information of the packet frame of the main signal in the upstream and downstream circuits is transmitted using the supervisory control circuit of the downstream and upstream circuits, respectively.

Further, in order to attain the objective, the present invention provides a packet transmission system for packet transmission between the terminal apparatuses, each having a supervisory control circuit configured to bidirectionally transmit the supervisory control signal on each and both of the upstream and the downstream circuits.

The packet transmission system includes a supervisory control apparatus configured to supervise and control the terminal apparatuses and the transmission line in-between.

The supervisory control apparatus is configured such that the overhead information of the packet frame of a main signal in the upstream and downstream circuits is transmitted using the supervisory control circuit of the downstream and upstream circuits, respectively.

BRIEF DESCRIPTION OF THE DRAWINGS

Other objectives, features, and advantages of the present invention will become still clearer by reading the following descriptions, referring to attached drawings.

FIG. 1 is a block diagram of a packet transmission system according to the first and second embodiments of the present invention.

FIG. 2 is a block diagram of the packet transmission system according to the first and second embodiments of the present invention.

FIG. 3 is a block diagram for explaining an example of a SONET frame signal processing unit of an SONET/DW interface board on the transmitting side.

FIG. 4 is a block diagram for explaining an example of a DW interface unit of a SONET/DW interface board on the transmitting side.

FIG. 5 is a block diagram for explaining an example of a DW interface unit of a SONET/DW interface board on the receiving side.

FIG. 6 is a block diagram for explaining an example of a SONET frame signal processing unit of a SONET/DW interface board on the receiving side.

FIG. 13 is a chart for explaining the frame structure of an OCh transport unit.

FIG. 14 is a table for explaining the contents of the header inserted in the 1-16 bytes of an OCh data unit.

FIG. 15 is a chart for explaining the transmission format of a supervisory control signal.

FIG. 16 is a table for explaining the transmission format of the supervisory control signal.

DESCRIPTION OF THE PREFERRED EMBODIMENTS

Figure 7A:
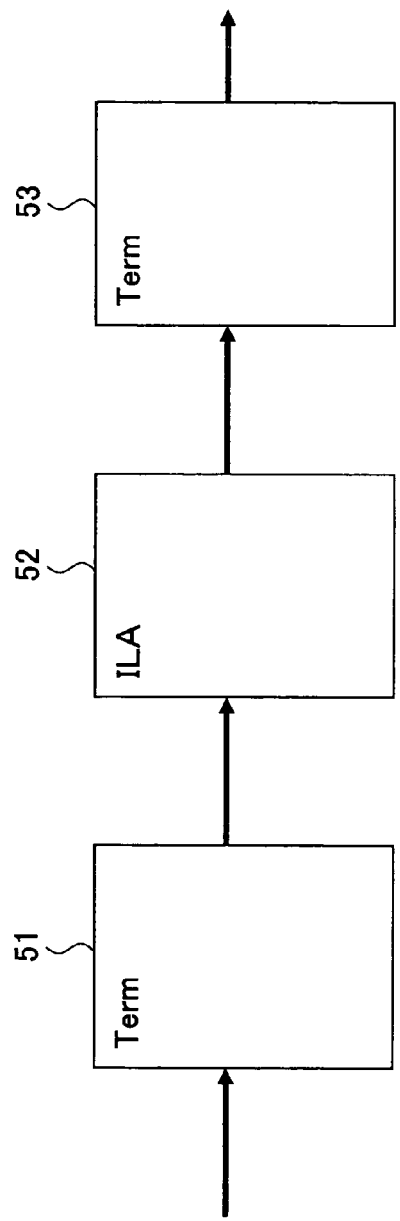
FIG. 7A is a block diagram of an example of a WDM apparatus on the upstream side.

In the following, embodiments of the present invention are described with reference to the attached drawings.

The First Embodiment

According to the first embodiment of the present invention, overhead information of a SONET frame is transmitted using a spare (stand-by) circuit when an active (currently being used) circuit fails.

Details are explained on the basis that SONET includes SDH.

(Configuration)

A packet transmission system according to the first embodiment is shown by FIG. 1 and FIG. 2. The packet transmission system includes a downstream terminal station 1, an upstream terminal station 2, an upstream WDM (Wavelength Division Multiplexing) apparatus 11, and a downstream WDM apparatus 14. The upstream WDM 11 and the downstream WDM apparatus 14 have a relaying function for a main signal and a supervisory control signal. The embodiment is workable regardless of the upstream WDM apparatus 11 and downstream WDM apparatus 14 performing amplification.

Further, the downstream terminal station 1 includes an upstream transmitting SONET/DW (Digital Wrapper) interface board 10, a SONET/DW supervisory control unit 12, and a downstream receiving SONET/DW interface board 13.

Here, the downstream terminal station 1 includes N (N being a natural number, 1 or greater) upstream transmitting SONET/DW interface boards 10, and N downstream receiving SONET/DW interface boards 13, while the number of the SONET/DW supervisory control units 12 is one. In addition, a SONET frame signal at an optical wavelength is provided to the upstream transmitting SONET/DW interface board 10, and a wavelength multiplexed optical signal containing N DW frames is provided to the upstream WDM apparatus 11 from the downstream terminal station 1. Further, the packet transmission system includes a supervisory control circuit that transmits a supervisory control signal in the direction opposite to the direction of the main signal.

That is, with reference to FIGS. 1 and 2, the upstream main signal flows as shown by a thick solid line (1), and the downstream main signal flows as shown by a thick dotted line (3). Further, the upstream supervisory control signal flows as shown by a thin solid line (2), and the downstream supervisory control signal flows as shown by a thin dotted line (4).

Further, the upstream transmitting SONET/DW interface board 10 of the downstream terminal station 1 includes a SONET frame receiving unit 101 configured to receive a SONET frame signal, a SONET frame signal processing unit 102 configured to perform extraction, insertion, and the like, of the overhead of the SONET frame, a DW interface unit 103 configured to convert the SONET frame into a DW frame, and a DW frame signal transmitting unit 104 configured to transmit the DW frame signal.

In addition, with reference to FIG. 3, the SONET frame signal processing unit 102 of the SONET/DW interface board 10 includes an OHB extracting unit 1021 configured to extract overhead bytes of the SONET frame, a CLK change unit 1022 configured to change the clock of the received signal from the line clock to the system clock of the terminal station, an OHB inserting unit 1023 configured to insert overhead bytes into the signal, the clock of which signal has been changed. The OHB inserting unit 1023 inserts the overhead of the local station or another station.

Further, the DW interface unit 103 of the SONET/DW interface board 10 includes a SONET/DW frame converting unit 1031 configured to convert the SONET frame into the DW frame, and an OHB inserting unit 1032 configured to insert overhead bytes of the DW frame into the DW frame, as shown in FIG. 4.

Returning to FIG. 1, the SONET/DW supervisory control unit 12 includes a transparent processing unit 121 configured to carry out a transparent process on the overhead, an OH information generating/extracting unit 122 configured to generate and extract overhead bytes of the SONET frame and the DW frame, and a supervisory control signal transceiver unit 123 configured to transmit and receive the supervisory control signal. Here, the number of OH information generating/extracting units 122 corresponds to the number of the SONET/DW interface boards.

Further, the downstream receiving SONET/DW interface board 13 of the downstream terminal station 1 includes a SONET frame transmitting unit 131 configured to transmit a SONET frame signal, a SONET frame signal processing unit 132 configured to perform extraction, insertion, etc., of the overhead of the SONET frame, a DW interface unit 133 configured to convert a DW frame into a SONET frame, and a DW frame signal receiving unit 134 configured to receive the DW frame signal.

Further, with reference to FIG. 5, the DW interface unit 133 of the downstream receiving SONET/DW interface board 13 of the downstream terminal station 1 includes an OHB extracting unit 1331 configured to extract the overhead bytes of the DW frame, a CLK change unit 1332 configured to change the clock of the received signal from the line clock to the system clock, and a DW/SONET frame converting unit 1333 configured to convert the DW frame into the SONET frame.

Further, with reference to FIG. 6, the SONET frame signal processing unit 132 of the downstream receiving SONET/DW interface board 13 of the downstream terminal station 1 includes an OHB extracting unit 1321 configured to extract the overhead bytes of the SONET frame, and a SONET frame OHB inserting unit 1322 configured to insert overhead bytes to the SONET frame.

The upstream terminal station 2 shown in FIG. 2 includes an upstream receiving SONET/DW interface board 15, a SONET/DW supervisory control unit 16, and a downstream transmitting SONET/DW interface board 17.

Here, the upstream receiving SONET/DW interface board 15, the SONET/DW supervisory control unit 16, and the downstream transmitting SONET/DW interface board 17 of the upstream terminal station 2 are of configurations similar to the downstream receiving SONET/DW interface board 13, the SONET/DW supervisory control unit 12, and the upstream transmitting SONET/DW interface board 10, respectively, of the downstream terminal station 1. Accordingly, explanations are not repeated.

(Operations)

The packet transmission system shown by FIG. 1 and FIG. 2 transmits the overhead information using the spare (stand-by) circuit when the active circuit (currently used) fails. As the spare circuit, the supervisory control circuit that transmits in the direction opposite to the main signal is used. That is, the spare circuit of the upstream is served by the downstream supervisory control circuit, and the spare circuit of the downstream is served by the upstream supervisory control circuit.

More specifically, in the case of the upstream, the active circuit of the overhead transmission is served by the main circuit (thick solid line (1)), and the spare circuit of the overhead transmission is served by the supervisory control signal circuit (thin solid line (2)).

Similarly, as for the downstream, the active circuit of the overhead transmission is served by the main circuit (thick dotted line (3)), and the spare circuit of the overhead transmission is served by the supervisory control signal circuit (thin dotted line (4)).

Switching between the active and the spare circuits for overhead information is carried out by the terminal station on the receiving side. In this manner, the first embodiment provides a simple configuration of the active/spare circuits for the supervisory control signal using the supervisory control circuit.

Operations of the packet transmission system shown by FIG. 1 are described. Since the upstream and downstream circuits are configured symmetrically, descriptions about the operations of the upstream circuit follow, and descriptions about the downstream circuit are omitted.

Two or more SONET frame signals supplied to the downstream terminal station 1 are provided to the upstream transmitting SONET/DW interface board 10.

First, the flow of the main signal is explained. At the upstream transmitting SONET/DW interface board 10, the supplied SONET frame signals are converted into DW frame signals, and are transmitted as an optical wavelength multiplexed signal from the DW frame signal transmitting unit 104.

Specifically, with reference to FIG. 3 and FIG. 4, the SONET frame OHB extracting unit 1021 extracts overhead bytes of the SONET frame from the supplied SONET frame signals. The extracted overhead information is supplied to the transparent processing unit 121 of the supervisory control unit 12, and the payload (data section), i.e., the SONET frame less the overhead, is supplied to the CLK change unit 1022. The CLK change unit 1022 changes the clock signal of the received payload (data section) from the line clock into the system clock of the terminal apparatus. Subsequently, the SONET frame OH inserting unit 1023 receives the removed overhead information from the transparent processing unit 121 of the supervisory control unit 12, and attaches the received overhead information to the payload (data section), the clock of which has been changed to the system clock by the CLK change unit 1022. In this manner, a SONET frame signal is generated.

The SONET frame signal is then converted into a DW frame signal by the SONET/DW frame converting unit 1031. Then, the OHB inserting unit 1032 inserts DW overhead bytes into the DW frame signal, and the DW overhead bytes-inserted DW frame signal is transmitted as an optical wavelength multiplexed signal from the DW frame signal transmitting unit 104.

The optical wavelength multiplexed signal is amplified by the upstream WDM apparatus 11, and transmitted to the upstream terminal station 2.

Figure 7B:
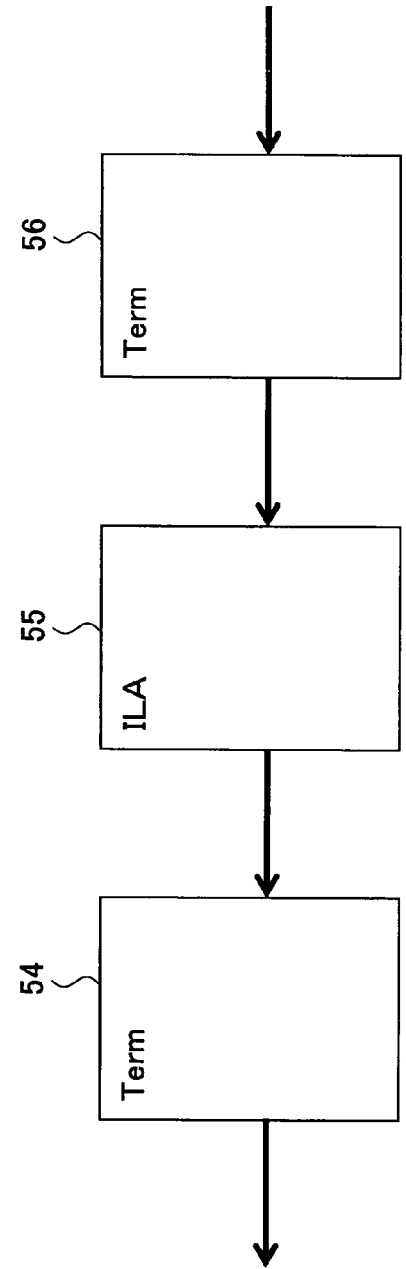
FIG. 7B is a block diagram of an example of a WDM apparatus on the downstream side.

The upstream WDM apparatus 11 includes optical terminals (TERM: Terminal) 51 and 53 that have optical wavelength multiplex/distribution functions, and an optical repeater (ILA: In Line Amplifier) 52 that has an optical amplification function, as shown in FIG. 7A. In addition, the structure of the downstream WDM apparatus 14 is shown in FIG. 7B.

The optical wavelength multiplexed signal amplified by the upstream WDM apparatus 11 is supplied to the upstream terminal station 2 shown in FIG. 2.

The DW frame signal receiving unit 134 of the upstream receiving SONET/DW interface board 15 of the upstream link terminal station 2 receives the DW frame signal that is optical wavelength multiplexed. The OHB extracting unit 1331 (refer to FIG. 5) extracts and removes the overhead bytes of the DW frame from the DW frame signal received by the DW frame signal receiving unit 134. Subsequently, a data section, i.e. the DW frame less the overhead, is supplied to the CLK change unit 1332, and the clock of the received data is changed from the line clock into the system clock of the terminal station. Subsequently, the DW/SONET frame converting unit 1333 converts the data, the clock of which has been changed to the system clock, from the DW frame into the SONET frame. Then, the OHB extracting unit 1321 (refer to FIG. 6) extracts the overhead bytes of the SONET frame. While the extracted overhead information is supplied to the transparent processing unit 121 of the supervisory control unit 16, the data section is supplied to the SONET frame OHB inserting unit 1322. Subsequently, the SONET frame OHB inserting unit 1322 receives the removed overhead information from the transparent processing unit 121 of the supervisory control unit 16, and generates an SONET frame signal by inserting the overhead information into the data section that has been obtained by the OHB extracting unit 1321 removing the overhead. The SONET frame transmitting unit 131 transmits the SONET frame signal that is generated as above.

Next, the case wherein the upstream fails is explained. In this case, the downstream terminal station 1 multiplexes the overhead information on the SONET frame of the upstream on the supervisory control circuit, and transmits it to the upstream terminal station 2.

The transparent processing unit 121 of the SONET/DW supervisory control unit 12 of the downstream terminal station 1 temporarily stores the overhead information of the SONET frame supplied by the OHB extracting unit 1021 of the SONET/DW interface board 10, returns the same overhead information to the OH inserting unit 1023 of the SONET/DW interface board 10, and provides the overhead information to the OH information generating/extracting unit 122 for transmission on the spare circuit.

Under normal operations, the supervisory control unit 12 supervises the upstream and downstream circuits, and transmits the supervisory control signal from the supervisory control signal transceiver unit 123 using the supervisory control circuit of the upstream and downstream circuits. When the upstream fails, the SONET/DW supervisory control unit 12 detects the upstream failure, and the supervisory control signal transceiver unit 123 maps the overhead information on the SONET frame about the upstream to the downstream supervisory control circuit, and transmits it to the downstream WDM apparatus 14. The supervisory control signal containing the mapped overhead information transmitted from the supervisory control signal transceiver unit 123 is amplified by the downstream WDM apparatus 14, and is transmitted to the upstream terminal station 2.

The supervisory control signal transceiver unit 123 of the upstream terminal station 2 receives the supervisory control signal that contains the mapped overhead information about the upstream SONET frame, and provides the supervisory control signal to the OH information generating/extracting unit 122. The OH information generating/extracting unit 122 extracts the overhead information about the upstream SONET frame from the received supervisory control signal. The extracted overhead information is provided to the transparent processing unit 121. The transparent processing unit 121 stores and uses the overhead information provided by the OH information generating/extracting unit 122.

In this manner, the upstream terminal station 2 can obtain the overhead information on the main signal even when the active circuit fails.

Here, the extracted overhead information about the upstream SONET frame can be provided to the SONET frame OHB inserting unit 1322 of the upstream receiving SONET/DW interface board 15 if required.

The Second Embodiment

To review, according to the packet transmission system of the first embodiment, the spare circuit is used when the active circuit is out of order for transmitting the overhead information to the counterpart.

However, the packet transmission system can be structured such that the supervisory control signal is always transmitted, rather than using the supervisory control circuit as the spare circuit, such that transmission of the supervisory control signal is surely performed.

That is, according to the second embodiment, the upstream overhead information of the SONET frame is contained in the main signal for transmission from the downstream terminal station 1 to the upstream terminal station 2, and the upstream overhead information of the SONET frame is also contained in the supervisory control signal for transmission using the supervisory control circuit.

Thus, the second embodiment realizes a simple redundant configuration about the overhead information of the SONET frame using a supervisory control circuit.

The configuration and operations that are different from the first embodiment are explained.

The transparent processing unit 121 of the SONET/DW supervisory control unit 12 of the downstream terminal station 1 stores the overhead information of the SONET frame supplied from the OHB extracting unit 1021 of the SONET/DW interface board 10, returns the same overhead information to the OH inserting unit 1023 of the SONET/DW interface board 10, and always supplies the overhead information to the OH information generating/extracting unit 122.

The OH information generating/extracting unit 122 keeps receiving the overhead information of the SONET frame supplied by the OHB extracting unit 1021, and maps the overhead information of the upstream SONET frame to the supervisory control signal. The supervisory control signal transceiver unit 123 provides the supervisory control signal, to which the overhead information of the upstream SONET frame is mapped, to the downstream WDM apparatus 14.

The supervisory control signal is amplified by the downstream WDM apparatus 14, and is transmitted to the upstream terminal station 2.

The supervisory control signal transceiver unit 123 of the upstream terminal station 2 receives the supervisory control signal, to which the overhead information of the upstream SONET frame is mapped, and provides the supervisory control signal to the OH information generating/extracting unit 122. The OH information generating/extracting unit 122 extracts the overhead information of the upstream SONET frame from the received supervisory control signal. The extracted overhead information of the upstream SONET frame is provided to the transparent processing unit 121.

The transparent processing unit 121 receives two sets of the overhead information of the upstream SONET frame. One is the overhead information provided by the OH information generating/extracting unit 122, and other is the overhead information of the main signal, which the OHB extracting unit 1321 of the upstream receiving SONET/DW interface board 15 has extracted.

Transparent processing unit 121 selects which overhead information is to be used by methods, such as:

priority be given to the overhead of the main signal, the overhead of the main signal is used when the main circuit is stable, otherwise the overhead of the supervisory control signal is used, and the overhead transmitted by the more stable circuit is used.

Further, the selected overhead is supplied to the SONET frame OHB inserting unit 1322 of the upstream receiving-side SONET/DW interface board 15.

As described above, redundancy is provided to the transmission of the overhead information on the SONET frame, and the overhead information on the SONET frame can be surely transmitted.

The Third Embodiment

Figure 8:
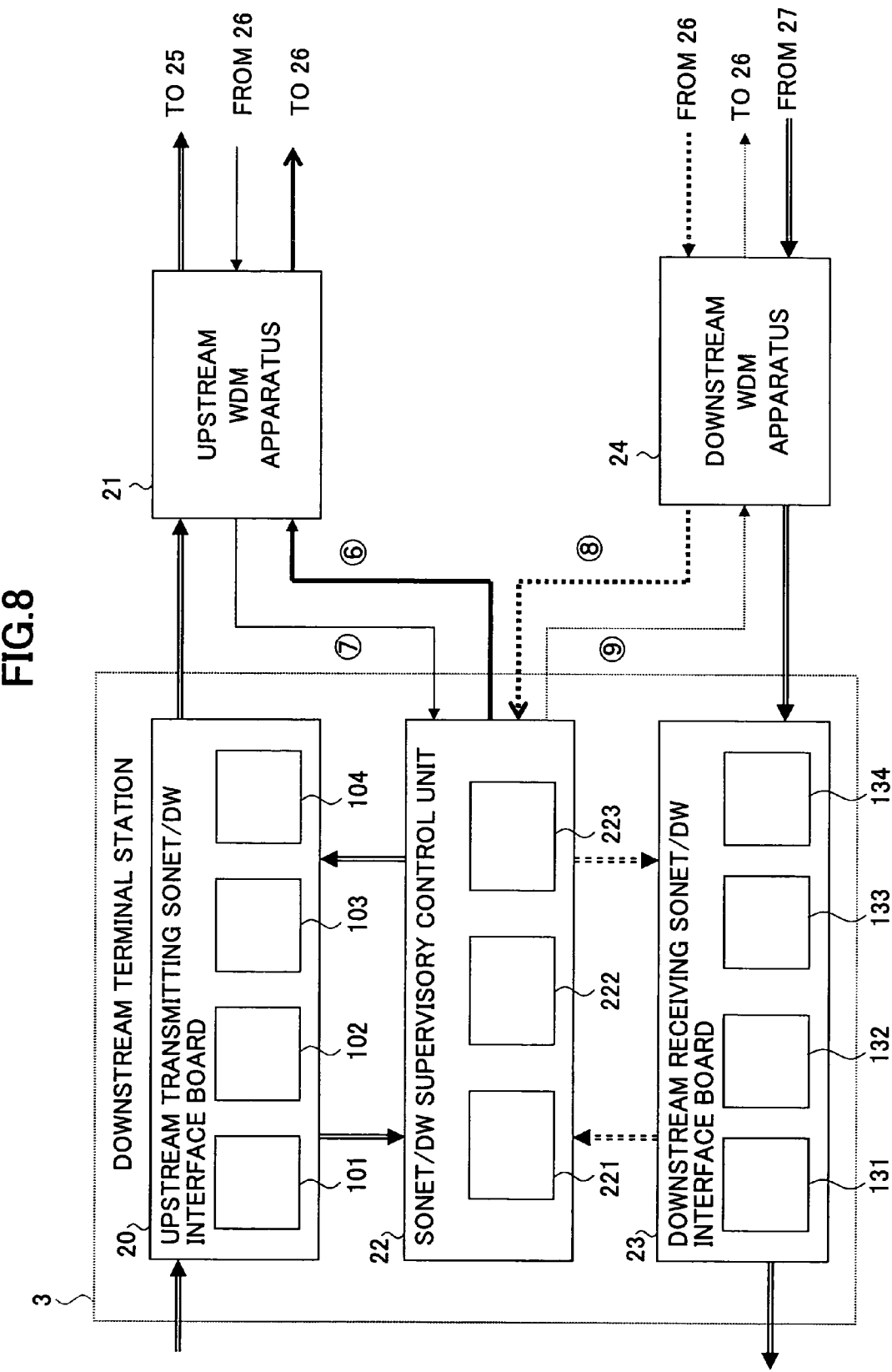
FIG. 8 is a block diagram of the packet transmission system according to the third embodiment of the present invention.
Figure 9:
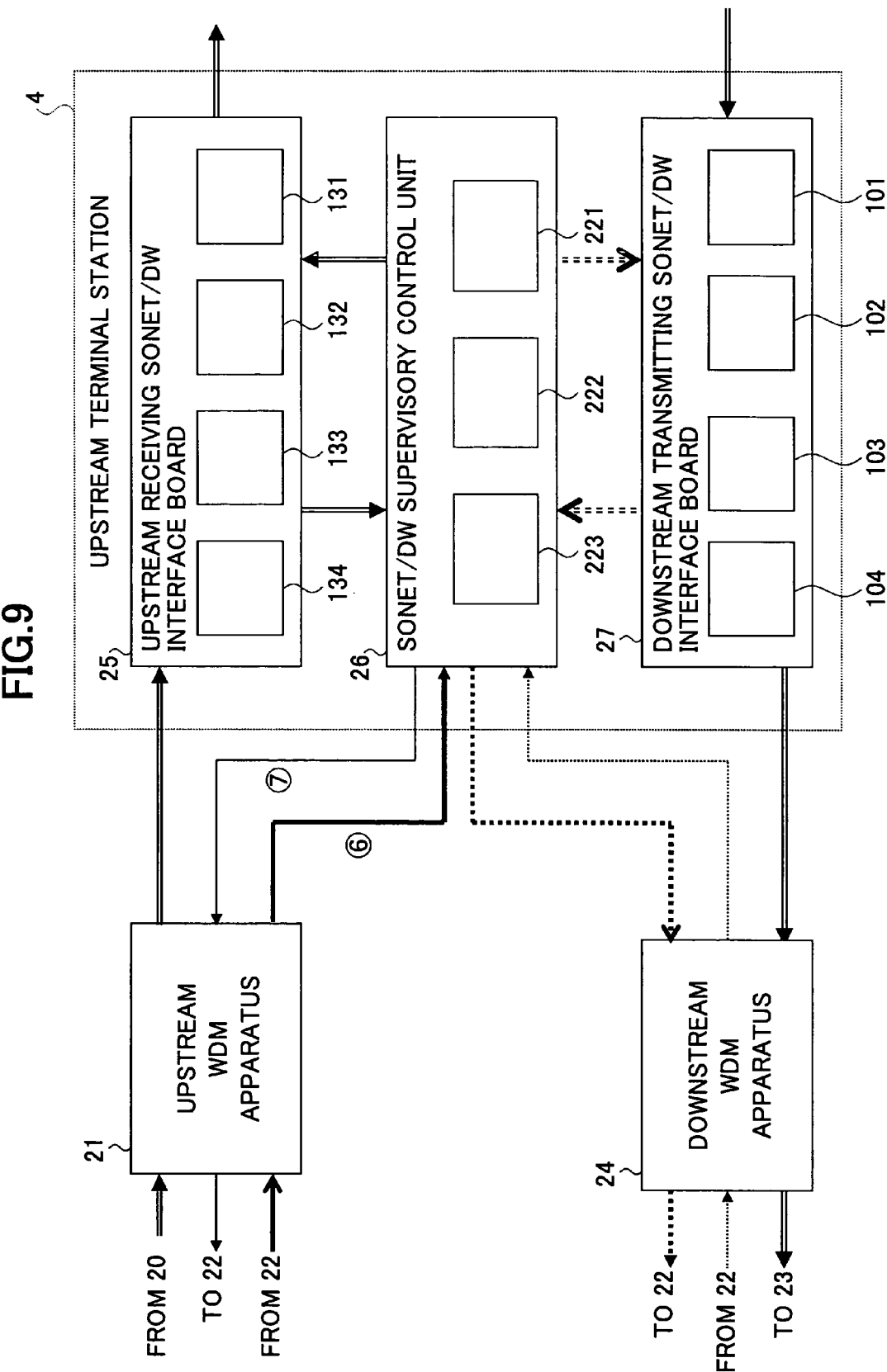
FIG. 9 is a block diagram of the packet transmission system according to the third embodiment of the present invention.

The configuration of the packet transmission system according to the third embodiment of the present invention is shown in FIG. 8 and FIG. 9. The packet transmission system includes a downstream terminal station 3, an upstream terminal station 4, an upstream WDM apparatus 21, and a downstream WDM apparatus 24. The upstream WDM 21 and the downstream WDM apparatus 24 amplify an optical wavelength multiplexed signal, and perform relaying functions. However, even if amplification is not carried out by the upstream WDM 21 and the downstream WDM apparatus 24, this embodiment remains valid.

Since the configuration and operations about the main signal according to the third embodiment (FIG. 8 and FIG. 9) are the same as those of the first and the second embodiments (FIG. 1 and FIG. 2), explanations are not repeated.

The third embodiment is notably different from the first embodiment in that the supervisory control signal is bidirectionally transmitted. (In the first/second embodiments, the supervisory control signal is transmitted in the direction opposite to the main signal.)

In the third embodiment, the bidirectional transmission of the supervisory control signal is carried out within the same fiber. In the same direction as the main signal, the overhead is mapped, e.g., in the DW format corresponding to an interval between optical repeaters; and the overhead of the SONET/SDH frame that contains at least DCC is mapped in the supervisory control signal that is transmitted in the direction opposite to the main signal. As described above, the bidirectional transmission of DCC can be realized at the time of one-way transmission of the main signal, offering an advanced management function when the apparatus starts operations, and when a circuit fails.

The apparatus configuration is the same as that shown by FIG. 1 and FIG. 2, except that the supervisory control signal is transmitted bidirectionally. Here, transmission of the supervisory control signal, which is different from the first embodiment, is explained. Further, since the configurations of the upstream and the downstream are symmetric, operations of the upstream are described, and descriptions of the downstream are omitted.

In this case, the downstream terminal station 3 multiplexes the overhead information of the upstream SONET frame on the supervisory control circuit (thick solid line marked (6)) in the upstream direction of the upstream, and transmits it to the upstream terminal station 4. Further, the upstream terminal station 4 multiplexes the overhead information of the upstream SONET frame on the supervisory control circuit (thin solid line marked (7)) in the downstream direction of the upstream, and transmits it to the downstream terminal station 3.

First, the supervisory control signal transmitted from the downstream terminal station 3 to the upstream terminal station 4 is described.

The transparent processing unit 221 of the SONET/DW supervisory control unit 22 of the downstream terminal station 3 temporarily stores the overhead information of the SONET frame supplied by the OHB extracting unit 1021 of the SONET/DW interface board 20, returns the same overhead information to the OH inserting unit 1023 of the SONET/DW interface board 10, and keeps providing the overhead information to the OH information generating/extracting unit 222.

The OH information generating/extracting unit 222 keeps receiving the overhead information of the SONET frame from the transparent processing unit 221, and maps the overhead information of the upstream SONET frame to the supervisory control signal. The supervisory control signal transceiver unit 223 transmits to the upstream WDM apparatus 21 the supervisory control signal, to which the overhead information of the upstream SONET frame is mapped (thick solid line marked (6)).

The supervisory control signal is amplified by the upstream WDM apparatus 21, and is transmitted to the upstream terminal station 4.

The supervisory control signal transceiver unit 223 of the upstream terminal station 4 receives the supervisory control signal reception, and provides the same to the OH information generating/extracting unit 222. The OH information generating/extracting unit 222 extracts the overhead information of the upstream SONET frame from the received supervisory control signal. The extracted overhead information of the upstream SONET frame is provided to the transparent processing unit 221.

The transparent processing unit 221 receives two sets of the overhead information of the upstream SONET frame. One is the overhead information from the OH information generating/extracting unit 222, and other is the overhead of the main signal that is extracted by the OHB extracting unit 1321 of the upstream receiving SONET/DW interface board 25.

The transparent processing unit 121 selects and uses one of the two sets of the overhead information.

Then, the selected overhead information is provided to the SONET frame OHB inserting unit 1322 of the upstream receiving SONET/DW interface board 25.

Next, the supervisory control signal provided by the upstream terminal station 4 to the downstream terminal station 3 is explained.

The upstream terminal station 4 multiplexes the upstream overhead information of the SONET frame generated by the OH information generating/extracting unit 222 of the upstream terminal station 4 on the supervisory control circuit in the downstream direction of the upstream circuit, and transmits the multiplexed signal to the downstream terminal station 3 (thin solid line (7)).

The supervisory control signal transceiver unit 223 of the downstream terminal station 3 receives the supervisory control signal, to which the overhead information of the upstream SONET frame is mapped, and sends the received signal to the OH information generating/extracting unit 222. The OH information generating/extracting unit 222 extracts the overhead information on the upstream SONET frame from the received supervisory control signal. The extracted overhead information is provided to the transparent processing unit 221. The transparent processing unit 221 uses the overhead information that is received.

Here, the above descriptions are made about the case where the overhead information on the SONET frame of the upstream is transmitted to the upstream terminal station 4 from the downstream terminal station 3, and to the downstream terminal station 3 from the upstream terminal station 4.

However, the following modes are also possible.

(1) The overhead information of the SONET frame in the upstream is transmitted to the upstream terminal station 4 from the downstream terminal station 3, and the overhead information concerning the SONET frame of the upstream is transmitted to the downstream terminal station 3 from the upstream terminal station 4.

(2) Out of the overhead information of the SONET frame of the upstream, only a signal related to supervisory control is transmitted to the upstream terminal station 4 from the downstream terminal station 3, and the overhead information concerning the supervisory control signal is transmitted to the downstream terminal station 3 from the upstream terminal station 4.

(3) The overhead information of the DW frame of the upstream is transmitted to the upstream terminal station 4 from the downstream terminal station 3, and the overhead information that includes the DCC information of the SONET frame is transmitted to the downstream terminal station 3 from the upstream terminal station 4.

Further, in the case of (1) or (2) above, the overhead information included in the main signal transmitted by the upstream can be used as the overhead information transmitted to the upstream terminal station 4 from the downstream terminal station 3.

In this way, transmission of the supervisory control signal from the downstream terminal station 3 to the upstream terminal station 4 can be dispensed with.

As described above, according to the third embodiment, bidirectional transmission of the overhead information is completed by one-way transmission (the upstream direction) of the main signal. When attention is paid to the section between the terminal stations, management using DCC within the apparatus can be realized.

Further, the network management can be provided to the upstream and the downstream independently.

(Digital Wrap—DW)

Figure 10:
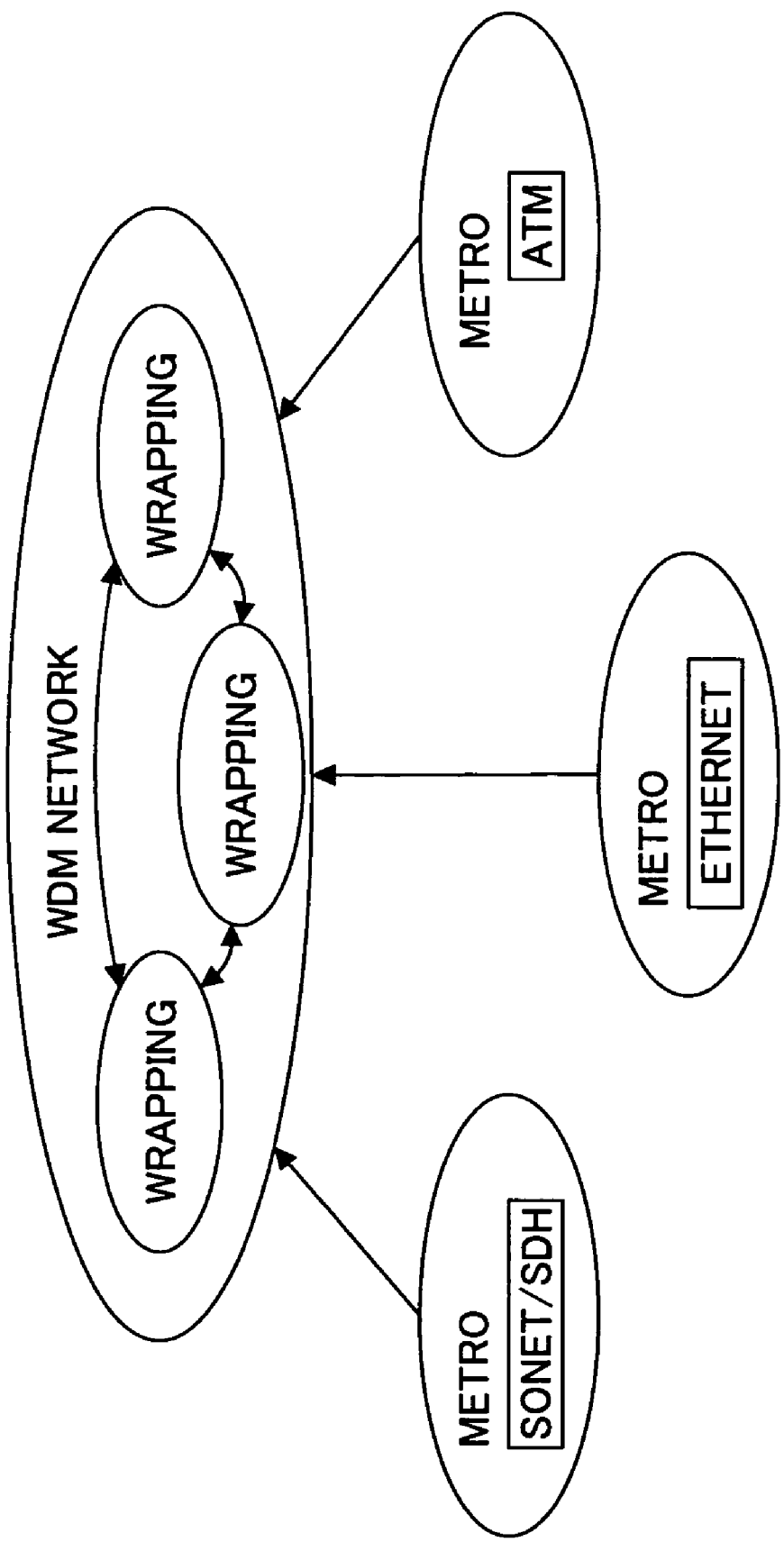
FIG. 10 is a network diagram for explaining DW (Digital Wrapping).

DW is a network layer considered in order to expand the capacity of a network. Using DW, a SONET/SDH frame signal, an Ethernet frame signal, an ATM (Asynchronous Transfer Mode) frame signal, etc., can exchange signals in a WDM network by wrapping in DW as shown in FIG. 10.

Figure 11:
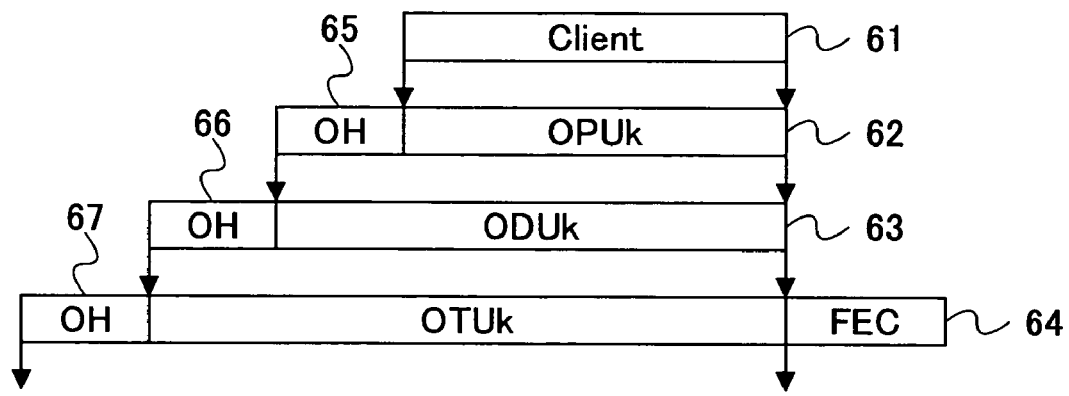
FIG. 11 is a chart for explaining OTN layers.

Based on FIG. 11, a layer of wrapping by DW (called OTN (Optical Transport Network)) is explained.

A header 65 is added to clients, such as data, for example, SONET STS-48c, etc., and an OCh payload unit is generated. To the OCh payload unit, a header 66 is added to make an OCh data unit. To the OCh data unit, a header 67 and FEC (forward direction error correction) 64 are added to make an OCh transport unit. The OCh transport unit facilitates the optical transmission of an optical wavelength multiplexed signal.

Figure 12:
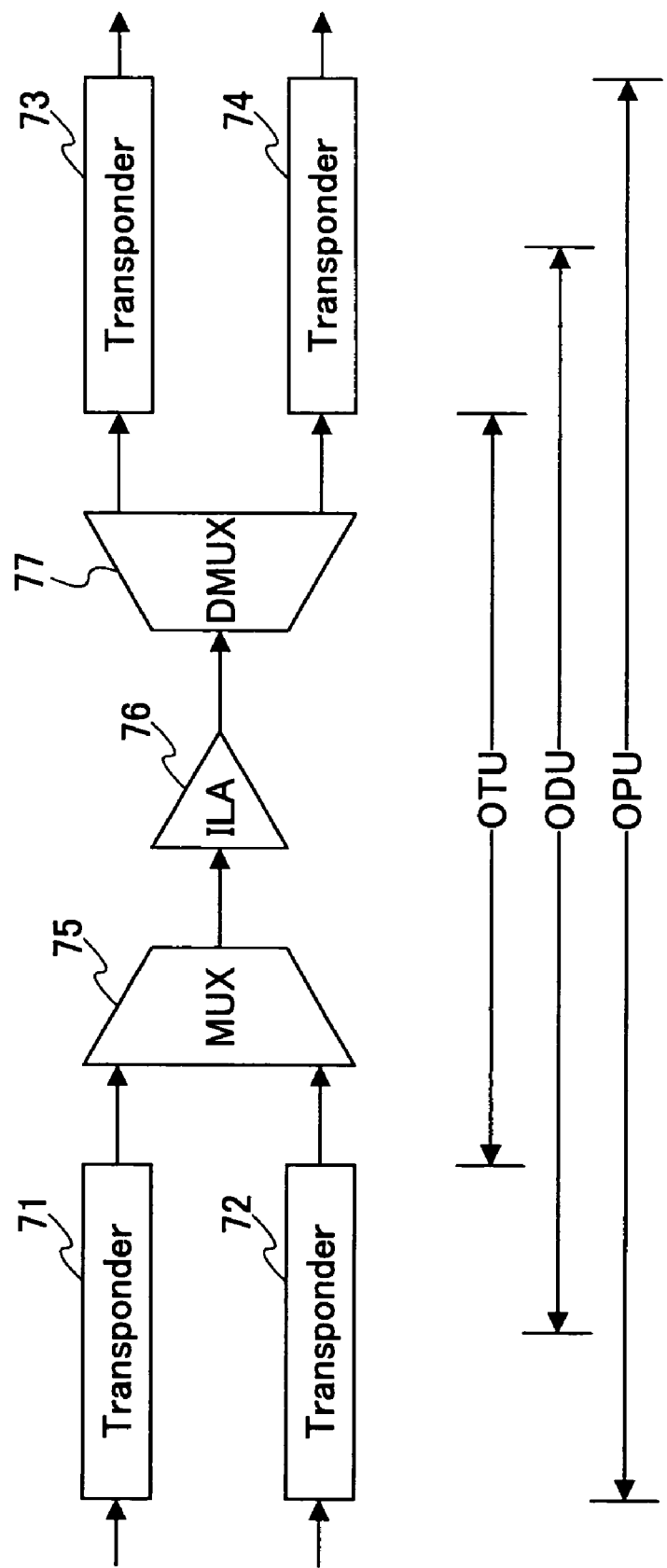
FIG. 12 is a block diagram for explaining the OTN layers.

How the relaying function is performed is shown in FIG. 12. A packet frame provided to transponders 71 and 72 is converted into OCh transport units by the transponders 71 and 72. The OCh transport units are multiplexed by a multiplexer (MUX) 75, amplified by an optical amplifier (ILA) 76, demultiplexed by a demultiplexer (DMUX) 77, and converted back to packet frames by transponders 73 and 74.

The transponders 71 through 74 in FIG. 12 are equivalent to the DW interface units in FIG. 1, FIG. 2, FIG. 8, and FIG. 9.

The header 65 is added at the input edge of the transponders 71 and 72, and is removed at the output edge of the transponders 73 and 74. Further, the header 66 is added by a processing unit of the transponders 71 and 72, and is removed by a processing unit of the transponders 73 and 74. Further, the header 67 is added at the output edge of the transponders 71 and 72, and is removed at the input edge of the transponders 73 and 74.

At (A) of FIG. 13, the frame structure of the OCh transport unit is shown, where byte arrangements of the headers 65 through 67, the OCh data unit 63, and FEC 64 are presented.

At (B) of FIG. 13, the structure of the OCh data unit is shown, wherein names of headers that are placed at byte 1 through 17 are shown with their respective positions. The contents of each header are as shown in FIG. 14.

(Supervisory Control Signal)

An example of the transmission format of the supervisory control signal is shown in FIG. 15. The transmission format shown in FIG. 15 is of a multi-frame structure of 24 sub-frames. Each sub-frame consists of 24 bytes, and can be transmitted on 24 channels of voice data.

Further, the frame structure in the case of transmitting a supervisory control signal by one sub-frame is shown at (A) of FIG. 16. The structure includes a DCC area and reserved bytes. At (B) of FIG. 16, a multi-frame of 24 sub-frames is shown, the sub-frame being shown at (A) of FIG. 16. In total, 24 sub-frames can be transmitted.

Figure 17:
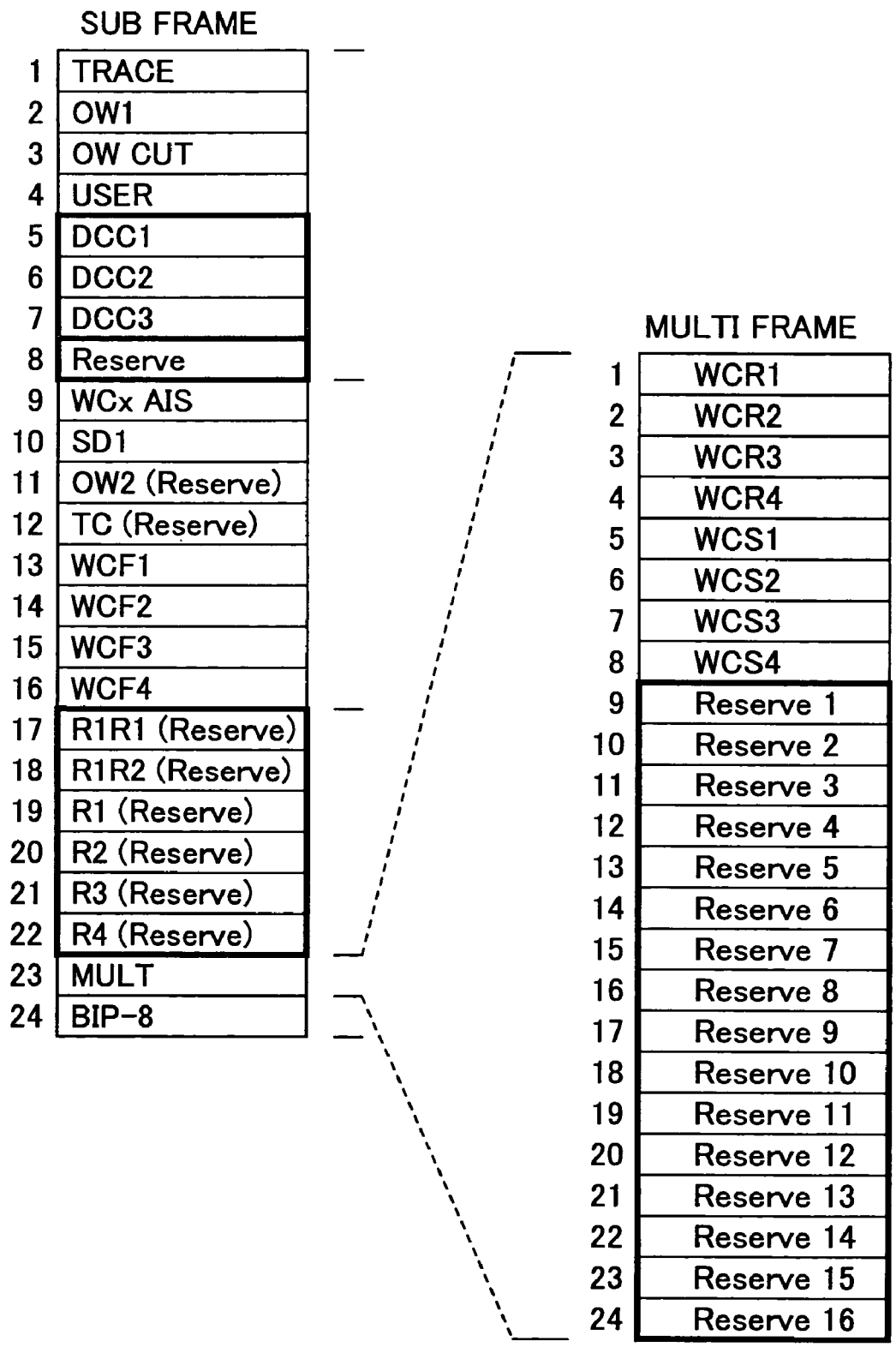
FIG. 17 is a chart for explaining the transmission format of the supervisory control signal.

FIG. 17 facilitates observing the supervisory control signal of the sub-frame of FIG. 16.

According to FIG. 17, DCC data can be transmitted by the 5th through 7th bytes, namely, DCC1 through DCC3 of the sub-frame. Further, for the purposes of the present invention, transmission of the overhead information of the SONET frame, and the like, can be transmitted using reserved bytes such as the 8th byte, the 17th through 22nd bytes of the sub-frame, and the 9th through 24th sub-frames of the multi-frame.

As described above, the packet transmission system according to the present invention is provided with redundancy such that the transmission of the supervisory control signal can surely be carried out.

Further, redundancy is provided for the overhead transmission without changing the system on a great scale. Further, the bidirectional transmission by DCC, etc., is realized by the system of one-way transmission of the main signal, so that apparatus cost is sharply reducible.

Although the above embodiments are described using SONET/SDH, the main signal does not have to be the frame of SONET/SDH; an Ethernet frame signal and an ATM frame signal, for example, can be used. In addition, the present invention is applicable to any other packet frame that has a header containing signals for supervisory control.

The present invention is not limited to the embodiments specifically described above, but can be varied and modified without deviating from the scope of the invention.

What is claimed is:

1. A packet transmission system for packet transmission between terminal apparatuses, each terminal apparatus comprising:
   a supervisory control circuit that transmits a supervisory control signal in a direction opposite to a transmission direction of a main signal on each of and both of an upstream circuit and a downstream circuit; wherein
   overhead information of a packet frame of the main signal of the upstream circuit and the downstream circuit is transmitted using the supervisory control circuit of the downstream circuit and the upstream circuit, respectively.

2. The packet transmission system as claimed in claim 1, wherein
   the supervisory control circuits of the downstream circuit and the upstream circuit are used as spare circuits for transmitting the overhead information of the packet frames of the main signals of the upstream circuit and the downstream circuit, respectively.

3. The packet transmission system as claimed in claim 1, wherein the terminal apparatus converts the packet frame of the main signal into a DW frame, carries out wavelength division multiplexing, and transmits the DW frame.

4. A packet transmission system for packet transmission between terminal apparatuses, each terminal apparatus comprising:
   a supervisory control circuit that bidirectionally transmits a supervisory control signal on each of and both of an upstream circuit and a downstream circuit; wherein overhead information of a packet frame of a main signal of the upstream circuit and the downstream circuit is transmitted using the supervisory control circuit of the downstream circuit and the upstream circuit, respectively.

5. The packet transmission system as claimed in claim 4, wherein the overhead information of the packet frame of the main signal of the upstream circuit and the downstream circuit includes DCC information.

6. A terminal apparatus of a packet transmission system, the terminal apparatus having a supervisory control circuit that transmits a supervisory control signal in a direction opposite to a transmission direction of a main signal on each of and both of an upstream circuit and a downstream circuit, comprising:
   a supervisory control apparatus configured to supervise and control the terminal apparatus and a transmission line, wherein
   the supervisory control apparatus transmits overhead information of a packet frame of the main signal on the upstream circuit and the downstream circuit using the supervisory control circuit of the downstream circuit and the upstream circuit, respectively.

7. The terminal apparatus as claimed in claim 6, wherein the supervisory control apparatus transmits the overhead information of the main signal packet frame using the supervisory control circuit of the downstream circuit and the upstream circuit when the upstream circuit and the downstream circuit, respectively, fail.

8. The terminal apparatus as claimed in claim 6, wherein the overhead information of the packet frame of the main signal on the upstream and the downstream includes DCC information.

9. The terminal apparatus as claimed in claim 6, further comprising:
   a packet frame signal processing unit configured to process the packet frame, and
   a DW interface unit configured to convert the packet frame into a DW frame.

10. The terminal apparatus as claimed in claim 9, wherein the packet processing unit and the DW interface unit are arranged on the same substrate.

11. The terminal apparatus as claimed in claim 6, wherein the supervisory control apparatus comprises:
   a transparent processing unit configured to receive header information of a packet from an overhead extracting unit of the packet processing unit, and to provide the header information to an overhead inserting unit of the packet processing unit; and
   an overhead generating and detecting unit; wherein
   the overhead generating and detecting unit transmits the header information of the packet using the supervisory control circuit.

12. A terminal apparatus of a packet transmission system, the terminal apparatus having a supervisory control circuit that bidirectionally transmits a supervisory control signal on each of and both of an upstream circuit and a downstream circuit, comprising:
   a supervisory control apparatus configured to supervise and control the terminal apparatus and a transmission line, wherein
   the supervisory control apparatus transmits overhead information of a packet frame of a main signal of the upper stream circuit and the downstream circuit using the supervisory control circuit of the downstream circuit and the upstream circuit, respectively.

13. The terminal apparatus as claimed in claim 12, wherein the overhead information of the packet frame on the upstream circuit and the downstream circuit includes DCC information.

* * * * *